(12) United States Patent
Moon et al.

(10) Patent No.: US 9,542,126 B2
(45) Date of Patent: Jan. 10, 2017

(54) REDUNDANT ARRAY OF INDEPENDENT DISKS SYSTEMS THAT UTILIZE SPANS WITH DIFFERENT STORAGE DEVICE COUNTS FOR A LOGICAL VOLUME

(71) Applicant: LSI CORPORATION, San Jose, CA (US)

(72) Inventors: David Moon, Boulder, CO (US); Anuj K. Jain, Duluth, GA (US); Gerald E. Smith, Niwot, CO (US); Naveen Krishnamurthy, Bangalore, IN (US); Subhankar Mukherjee, Suwanee, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 563 days.

(21) Appl. No.: 13/867,324

(22) Filed: Apr. 22, 2013

(65) Prior Publication Data

US 2014/0317346 A1  Oct. 23, 2014

(51) Int. Cl.
*G06F 3/06* (2006.01)
*G06F 11/10* (2006.01)

(52) U.S. Cl.
CPC ........... *G06F 3/0689* (2013.01); *G06F 3/0619* (2013.01); *G06F 3/0665* (2013.01); *G06F 11/1076* (2013.01); *G06F 2211/1026* (2013.01)

(58) Field of Classification Search
CPC .......... G06F 3/06; G06F 11/10; G06F 2211/10
USPC ........................................... 711/114
See application file for complete search history.

(56) References Cited

U.S. PATENT DOCUMENTS

| | | | |
|---|---|---|---|
| 6,311,251 B1* | 10/2001 | Merritt | G06F 3/0689 711/114 |
| 7,873,782 B2 | 1/2011 | Terry et al. | |
| 8,316,180 B2 | 11/2012 | Galloway et al. | |
| 2003/0074527 A1* | 4/2003 | Burton | G06F 11/1096 711/114 |
| 2006/0112222 A1* | 5/2006 | Barrall | G06F 3/0689 711/114 |
| 2007/0180214 A1* | 8/2007 | Radhakrishnan | G06F 3/0689 711/202 |
| 2012/0290788 A1 | 11/2012 | Klemm et al. | |

\* cited by examiner

*Primary Examiner* — Charles Rones
*Assistant Examiner* — Andrew Russell

(57) ABSTRACT

Methods and structure are provided for defining span sizes for Redundant Array of Independent Disks (RAID) systems. One embodiment is a RAID controller that includes a control system and a span manager. The control system is able to identify storage devices coupled with the controller and is able to receive input requesting the creation of a RAID logical volume. The span manager is able to define multiple RAID spans to implement the volume, each span comprising one or more of the coupled storage devices, at least one of the spans including a different number of drives than at least one other span.

20 Claims, 6 Drawing Sheets

RETRIEVING DATA FROM A SPECIFIED LOGICAL BLOCK ADDRESS (LBA)

REDUNDANT ARRAY OF INDEPENDENT DISKS SYSTEMS THAT UTILIZE SPANS WITH DIFFERENT STORAGE DEVICE COUNTS FOR A LOGICAL VOLUME

FIELD OF THE INVENTION

The invention relates generally to Redundant Array of Independent Disks (RAID) systems, and more specifically to spans of storage devices used for RAID systems.

BACKGROUND

In existing RAID storage systems, multiple storage devices can be used to implement a logical volume of data. When the data for the volume is kept on multiple storage devices, the data can be accessed more quickly because the throughput of each individual storage device can be combined. Furthermore, when the data is stored on multiple storage devices, redundancy information can be maintained so that the data will be preserved even if a storage device fails. In RAID storage systems, sets of disks known as "spans" may each implement an independent RAID configuration. However, when multiple spans are used to implement a logical volume, each span uses the same RAID configuration, the same number of drives, and the same drive capacity.

SUMMARY

Systems and methods herein provide RAID systems that allow for a single logical volume to be implemented on multiple spans made up of different numbers and even different sizes of storage devices.

One exemplary embodiment is a RAID controller that includes a control system and a span manager. The control system is able to identify storage devices coupled with the controller and is able to receive input requesting the creation of a RAID logical volume. The span manager is able to define multiple RAID spans to implement the volume, each span comprising one or more of the coupled storage devices, at least one of the spans including a different number of drives than at least one other span.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
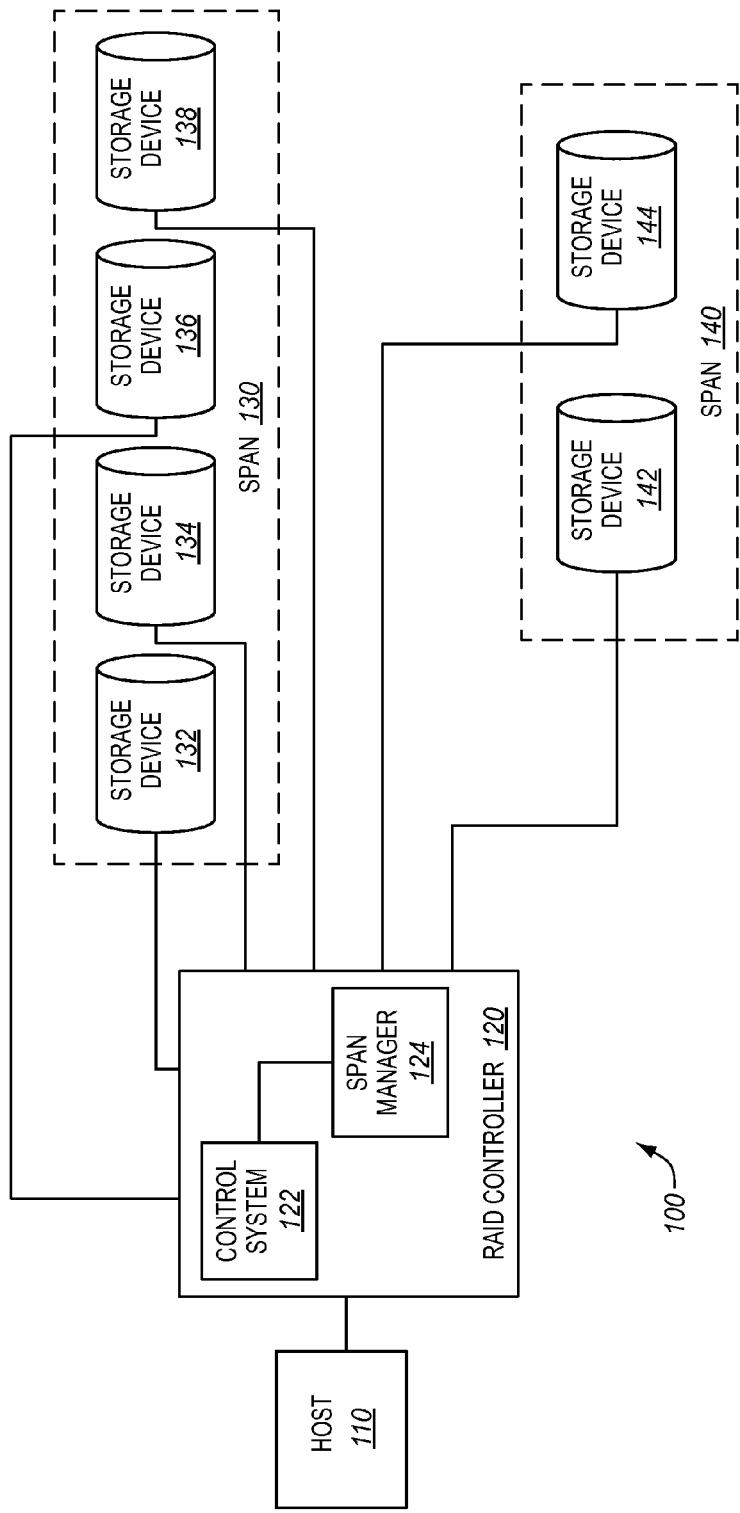
FIG. 1 is a block diagram of an exemplary Redundant Array of Independent Disks (RAID) storage system.

FIG. 1 is a block diagram of an exemplary Redundant Array of Independent Disks (RAID) storage system 100. In this embodiment, RAID storage system 100 includes host 110, which accesses and/or alters data stored on a logical volume by transmitting Input/Output (I/O) commands for the logical volume to RAID controller 120.

While in operation, RAID controller 120 translates the I/O operations from host 110 to correlate logical addresses requested by host 110 with physical locations/addresses on the storage devices of spans 130 and 140. Here, span 130 has been defined to include storage devices 132-138, while span 140 has been defined to include storage devices 142-144. RAID controller 120 may be implemented as custom circuitry, as a processor executing programmed instructions stored in program memory, or some combination thereof. In one embodiment, RAID controller 120 comprises a Host Bus Adapter (HBA) for host 110.

RAID controller 120 includes control system 122 and span manager 124. Control system 122 performs RAID control operations such as detecting coupled storage devices, translating host I/O requests for logical addresses into RAID requests for physical addresses, performing patrol reads, performing consistency checks, etc. Span manager 124 is capable of assigning coupled storage devices to one or more spans that implement RAID configurations for logical volumes. Span manager 124 also defines RAID spans for a logical volume that utilize different numbers of storage devices.

While RAID controller 120 is illustrated in FIG. 1 as being directly coupled with multiple storage devices, in some embodiments RAID controller 120 may be coupled with various storage devices via a switched fabric. A switched fabric comprises any suitable combination of communication channels operable to forward/route communications for a storage system, for example, according to protocols for one or more of Small Computer System Interface (SCSI), Serial Attached SCSI (SAS), Fibre Channel, Ethernet, Internet SCSI (ISCSI), etc. In one embodiment, a switched fabric comprises a combination of SAS expanders that link to one or more target storage devices.

A logical volume comprises allocated storage space and data implemented on storage devices. RAID controller 120 represents a logical volume to host 110 as a continuous set of Logical Block Addresses (LBAs). Thus, host 110 does not waste processing resources determining the exact physical locations of data on RAID storage system 100. RAID controller 120 may implement a logical volume on one or many spans of storage devices as desired. The spans that implement a volume need not include the same numbers of storage devices. However, each span for a logical volume is configured to implement the same RAID level.

In this embodiment, storage devices 132-138 and 142-144 implement the storage capacity of the logical volume, and are capable of writing and/or reading data in a computer readable format. For example, the storage devices may comprise magnetic hard disks, solid state drives, optical media, etc. compliant with protocols for SAS, Serial Advanced Technology Attachment (SATA), Fibre Channel, etc.

The particular arrangement, number, and configuration of components described herein is exemplary and non-limiting.

Figure 2:
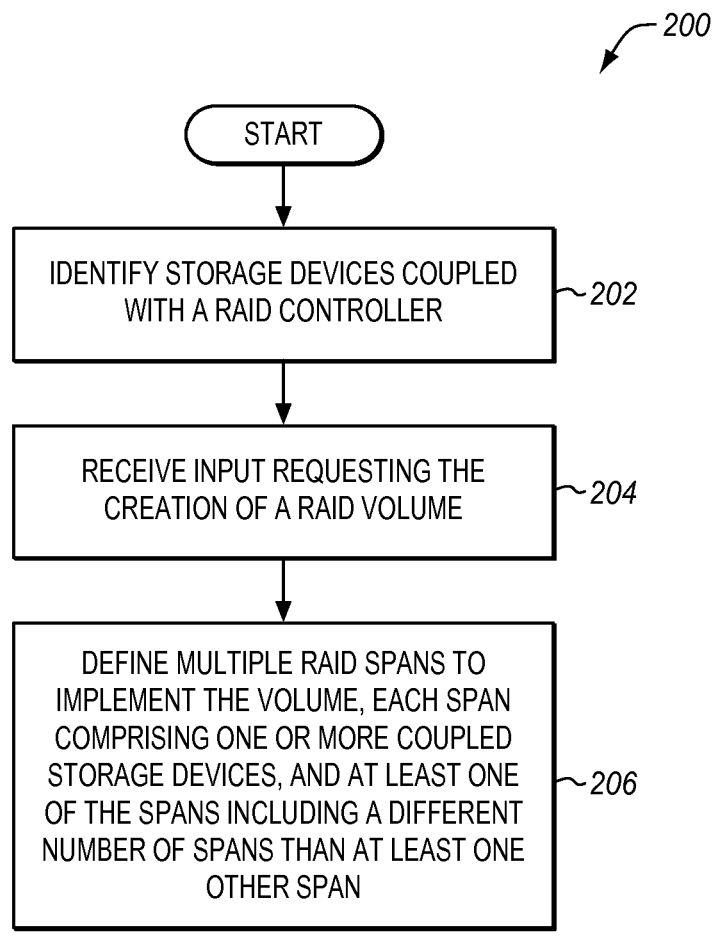
FIG. 2 is a flowchart describing an exemplary method to define spans of disks for a RAID system.

FIG. 2 is a flowchart 200 describing an exemplary method to define spans of disks for a RAID system. Assume, for the purposes of FIG. 2 below, that RAID controller 120 initializes a discovery process (e.g., when RAID storage system 100 is first implemented) in order to identify which storage devices it is coupled with.

In step 202, control system 122 identifies storage devices that are coupled with RAID controller 120. In one embodiment, this includes actively querying the device name and capacity of each storage device identified during a discovery process, and storing that information in memory at RAID controller 120 for later reference. In a further embodiment, the device address (e.g., SAS address) and capacity of each storage device is programmed into a memory of control system 122 through a management interface at RAID controller 120.

In step 204, control system 122 receives input requesting the creation of a RAID volume. In one embodiment, this input is provided by host 110, and the input indicates a size for the logical volume, an identifier for the logical volume, and further indicates a requested RAID level for the logical volume (e.g., RAID 0, 1, 5, 10, 50, etc.).

In step 206, span manager 124 of RAID controller 120 defines multiple RAID spans to implement the requested volume. Each RAID span for the requested volume uses the same RAID level. However, the number and size of storage devices in each span may vary (so long as the number of storage devices meets the minimum number of storage devices required by the chosen RAID level). Thus, span manager 124 is capable of more fully utilizing the existing storage space for the storage system, despite the increased complexity of managing spans of a non-uniform size.

In one embodiment, as a part of this process, span manager 124 specifically determines the number of storage devices to place into each span. For example, span manager 124 can place storage devices with the same or similar capacity levels into the same spans. In this way, the capacity of one span may vary from the capacity of another span, but each storage device within a single span will have approximately the same amount of storage space.

In one embodiment, the number of storage devices in each span depends upon the requested RAID level for the span and the number of the coupled storage devices that have not yet been assigned to spans. For example, a number of storage devices to use in a span may be defined as any number that is A) greater than or equal to the minimum number of storage devices required for the RAID level, B) less than or equal to a predefined maximum number of storage devices, and also C) less than or equal to the number of remaining storage devices that have not yet been assigned to spans.

In a further embodiment, the span manager calculates the span size (in number of drives) as a function of the requested RAID level for the volume, the number and identity of the drives used for the volume, and the capacity of each storage device.

Once a span has been defined for the logical volume, rows of RAID storage may be allocated across each span to store data for the logical volume (e.g., based on a starting and ending logical address for the logical volume). A row is a set of physical locations/addresses distributed across a span of storage devices. Each row includes a strip of data for each storage device in the span. A strip is allocated space for one or more blocks of data for one or more logical addresses (or parity/redundancy data for such logical addresses) on a specific storage device. The number of logical addresses stored per strip is referred to as the "depth" of a strip.

When the physical locations on the storage devices have been allocated for the logical volume, span manager 124 proceeds to map the physical addresses of the spans and/or storage devices to logical addresses of the volume. For example, mapping may include allocating logical addresses for the volume to specific rows of data, and then assigning rows of data to physical locations on the storage devices of the span.

Span manager 124 stores this mapping data in memory (e.g., at RAID controller 120 and/or on the storage devices themselves) in order to enable translation between logical addresses requested by host 110 and physical addresses on the storage devices.

Even though the steps of method 200 are described with reference to RAID storage system 100 of FIG. 1, method 200 may be performed in other RAID systems. The steps of the flowcharts described herein are not all inclusive and may include other steps not shown. The steps described herein may also be performed in an alternative order.

Figure 3:
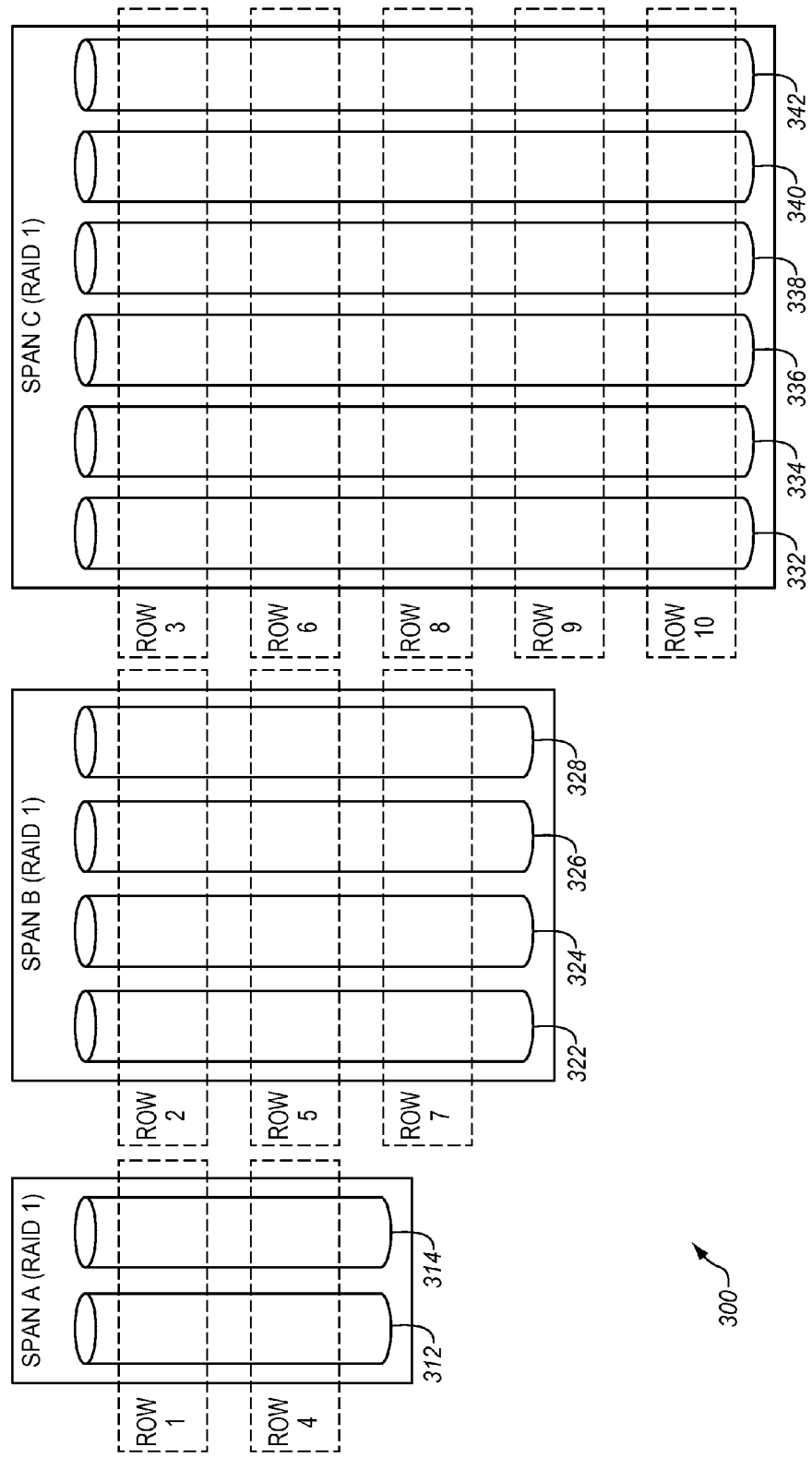
FIG. 3 is a block diagram illustrating an exemplary set of spans for a RAID system.

FIG. 3 is a block diagram illustrating an exemplary set of spans for a RAID system that implements a logical volume. According to FIG. 3, each span of the RAID system (Span A, Span B, and Span C) includes rows of RAID data for a RAID level 1 volume. Span A includes disks 312 and 314 (disk 314 mirrors disk 312), Span B includes disks 322-328 (disks 326-328 mirror disks 322-324), and Span C includes disks 332-342 (disks 338-342 mirror disks 332-336).

Figure 4:
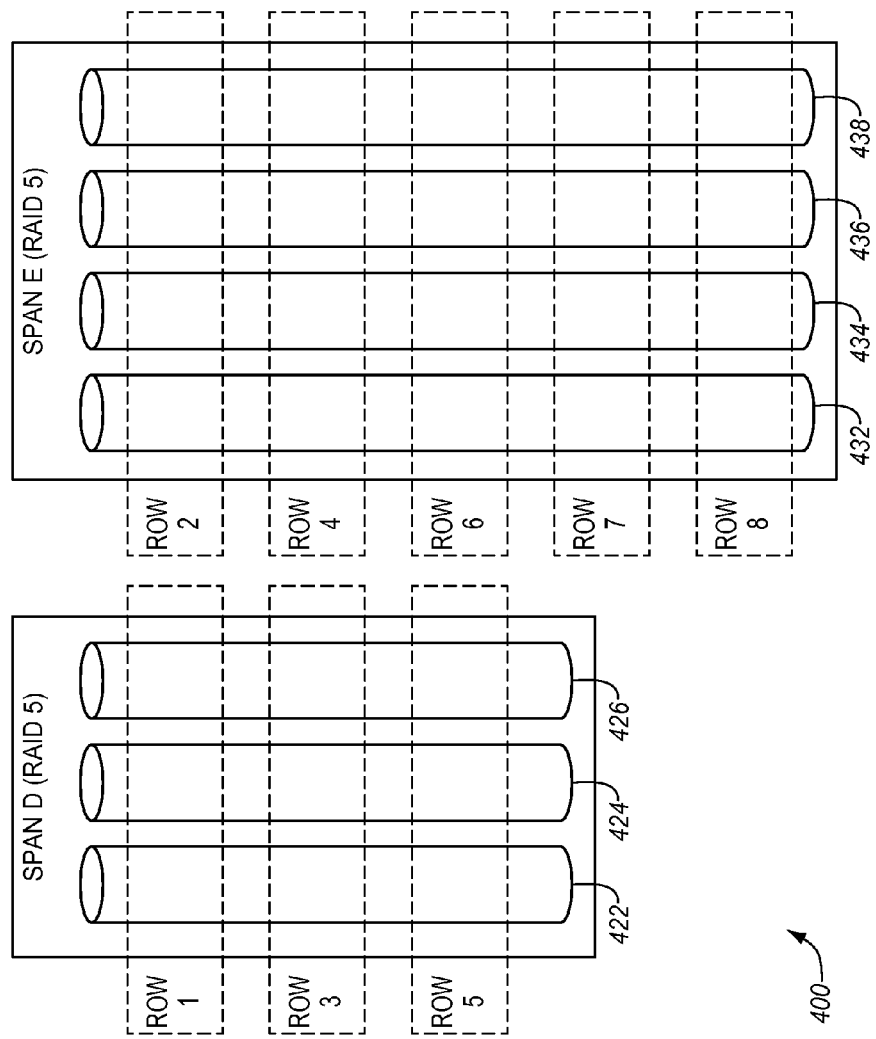
FIG. 4 is a block diagram illustrating an additional exemplary set of spans for a RAID system.

Here, less data is stored on Span A than on Span B, because Span A uses fewer disks, and has a smaller capacity per disk than Span B. A RAID controller initially distributes rows of logical block addresses evenly across each of the spans. However, eventually the capacity of Span A runs out. With the capacity of Span A filled, the RAID controller distributes the rows evenly between Span B and Span C until Span B is filled, and then assigns the remaining rows to disks 332-342 of Span C. While FIG. 3 illustrates an example wherein a RAID 1E volume is split across multiple spans of different disks, the principles may apply equally well to any suitable RAID level. FIG. 4 below illustrates a RAID storage system that implements RAID 5 spans.

In one embodiment, each set of rows that is evenly distributed across a set of spans is referred to as a "continuity." For example, in FIG. 3, rows 1-6 define a first continuity (because they are evenly distributed across spans A, B, and C), rows 7-8 define a second continuity (because they are evenly distributed across spans B and C), and rows 9-10 define a third continuity (because they are evenly distributed across span C). Span manager 124 then maintains mapping data for each continuity. For example, this mapping data can indicate the number and identity of the spans that the continuity is distributed across, the starting and ending logical addresses for the continuity, the starting and ending strip and row for the continuity, a strip offset array, and a width (in terms of storage size) for the rows in each span of the continuity.

FIG. 4 is a block diagram 400 illustrating an additional exemplary set of spans for a RAID system. According to FIG. 4, Span D implements a RAID 5 configuration with three disks (disks 422, 424, and 426), while Span E implements a RAID 5 configuration with four disks (disks 432, 434, 436, and 438). In one embodiment, rows are distributed across spans in the same manner described above with regard to FIG. 3.

By assigning rows to spans, and by computing each row based on the span it is assigned to (instead of using a uniform definition of rows that is consistent across the entire logical volume), more storage space can be utilized without sacrificing data redundancy or performance.

Figure 5:
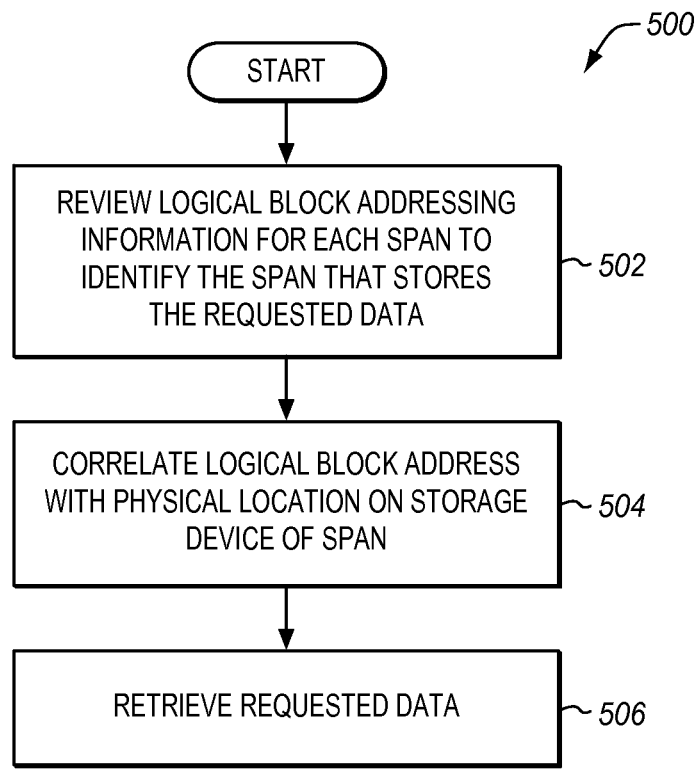
FIG. 5 is a flowchart describing an exemplary correlation of Logical Block Addresses (LBAs) with physical addresses in a RAID storage system.

FIG. 5 is a flowchart 500 describing an exemplary correlation of Logical Block Addresses (LBAs) with physical addresses in a RAID storage system. Assume, for this embodiment, that RAID controller 120 of FIG. 1 has received an I/O request from host 110 for processing one or more Logical Block Addresses (LBAs) of a logical volume. In step 502, control system 122 of RAID controller 120 determines the LBAs requested by host 110, and reviews LBA addressing information for each span to identify the span that stores each requested LBA.

With the appropriate span identified, in step 504 control system 122 correlates each requested LBA with a physical location on a storage device of an identified span. In step 506 control system 122 retrieves the data for each requested LBA from the corresponding physical location on the storage device of the appropriate span (e.g., by transmitting a read request to the appropriate storage devices that directs the storage devices to read data from specific physical locations).

EXAMPLES

Table 1 below illustrates an exemplary system for distributing drives for a RAID 1E volume into multiple spans. Note that the spans need not include the same number of drives.

TABLE 1

Distribution of Drives into Spans for a RAID 1E Logical Volume

| Total Drives | Span 1 | Span 2 | Span 3 | Span 4 | Span 5 | Span 6 | Span 7 | Span 8 |
|---|---|---|---|---|---|---|---|---|
| 4 | 4 | 0 | 0 | 0 | 0 | 0 | 0 | 0 |
| 6 | 6 | 0 | 0 | 0 | 0 | 0 | 0 | 0 |
| 8 | 8 | 0 | 0 | 0 | 0 | 0 | 0 | 0 |
| 10 | 10 | 0 | 0 | 0 | 0 | 0 | 0 | 0 |
| 12 | 12 | 0 | 0 | 0 | 0 | 0 | 0 | 0 |
| 14 | 14 | 0 | 0 | 0 | 0 | 0 | 0 | 0 |
| 16 | 16 | 0 | 0 | 0 | 0 | 0 | 0 | 0 |
| 18 | 18 | 0 | 0 | 0 | 0 | 0 | 0 | 0 |
| 20 | 20 | 0 | 0 | 0 | 0 | 0 | 0 | 0 |
| 22 | 22 | 0 | 0 | 0 | 0 | 0 | 0 | 0 |
| 24 | 24 | 0 | 0 | 0 | 0 | 0 | 0 | 0 |
| 26 | 26 | 0 | 0 | 0 | 0 | 0 | 0 | 0 |
| 28 | 28 | 0 | 0 | 0 | 0 | 0 | 0 | 0 |
| 30 | 30 | 0 | 0 | 0 | 0 | 0 | 0 | 0 |
| 32 | 32 | 0 | 0 | 0 | 0 | 0 | 0 | 0 |
| 34 | 16 | 18 | 0 | 0 | 0 | 0 | 0 | 0 |
| 36 | 18 | 18 | 0 | 0 | 0 | 0 | 0 | 0 |
| 38 | 18 | 20 | 0 | 0 | 0 | 0 | 0 | 0 |
| 40 | 20 | 20 | 0 | 0 | 0 | 0 | 0 | 0 |
| 42 | 14 | 14 | 14 | 0 | 0 | 0 | 0 | 0 |
| 44 | 22 | 22 | 0 | 0 | 0 | 0 | 0 | 0 |
| 46 | 22 | 24 | 0 | 0 | 0 | 0 | 0 | 0 |
| 48 | 24 | 24 | 0 | 0 | 0 | 0 | 0 | 0 |
| 50 | 10 | 10 | 10 | 10 | 10 | 0 | 0 | 0 |
| 52 | 26 | 26 | 0 | 0 | 0 | 0 | 0 | 0 |
| 54 | 18 | 18 | 18 | 0 | 0 | 0 | 0 | 0 |
| 56 | 28 | 28 | 0 | 0 | 0 | 0 | 0 | 0 |
| 58 | 28 | 30 | 0 | 0 | 0 | 0 | 0 | 0 |
| 60 | 30 | 30 | 0 | 0 | 0 | 0 | 0 | 0 |
| 62 | 30 | 32 | 0 | 0 | 0 | 0 | 0 | 0 |
| 64 | 32 | 32 | 0 | 0 | 0 | 0 | 0 | 0 |
| 66 | 22 | 22 | 22 | 0 | 0 | 0 | 0 | 0 |
| 68 | 22 | 22 | 24 | 0 | 0 | 0 | 0 | 0 |
| 70 | 14 | 14 | 14 | 14 | 14 | 0 | 0 | 0 |
| 72 | 24 | 24 | 24 | 0 | 0 | 0 | 0 | 0 |
| 74 | 24 | 24 | 26 | 0 | 0 | 0 | 0 | 0 |
| 76 | 24 | 26 | 26 | 0 | 0 | 0 | 0 | 0 |
| 78 | 26 | 26 | 26 | 0 | 0 | 0 | 0 | 0 |
| 80 | 20 | 20 | 20 | 20 | 0 | 0 | 0 | 0 |
| 82 | 20 | 20 | 20 | 22 | 0 | 0 | 0 | 0 |
| 84 | 28 | 28 | 28 | 0 | 0 | 0 | 0 | 0 |
| 86 | 28 | 28 | 30 | 0 | 0 | 0 | 0 | 0 |
| 88 | 22 | 22 | 22 | 22 | 0 | 0 | 0 | 0 |
| 90 | 30 | 30 | 30 | 0 | 0 | 0 | 0 | 0 |
| 92 | 30 | 30 | 32 | 0 | 0 | 0 | 0 | 0 |
| 94 | 30 | 32 | 32 | 0 | 0 | 0 | 0 | 0 |
| 96 | 32 | 32 | 32 | 0 | 0 | 0 | 0 | 0 |
| 98 | 14 | 14 | 14 | 14 | 14 | 14 | 14 | 0 |
| 100 | 20 | 20 | 20 | 20 | 20 | 0 | 0 | 0 |
| 102 | 20 | 20 | 20 | 20 | 22 | 0 | 0 | 0 |
| 104 | 26 | 26 | 26 | 26 | 0 | 0 | 0 | 0 |
| 106 | 26 | 26 | 26 | 28 | 0 | 0 | 0 | 0 |
| 108 | 18 | 18 | 18 | 18 | 18 | 18 | 0 | 0 |
| 110 | 22 | 22 | 22 | 22 | 22 | 0 | 0 | 0 |
| 112 | 28 | 28 | 28 | 28 | 0 | 0 | 0 | 0 |
| 114 | 28 | 28 | 28 | 30 | 0 | 0 | 0 | 0 |
| 116 | 28 | 28 | 30 | 30 | 0 | 0 | 0 | 0 |
| 118 | 28 | 30 | 30 | 30 | 0 | 0 | 0 | 0 |
| 120 | 30 | 30 | 30 | 30 | 0 | 0 | 0 | 0 |
| 122 | 30 | 30 | 30 | 32 | 0 | 0 | 0 | 0 |
| 124 | 30 | 30 | 32 | 32 | 0 | 0 | 0 | 0 |
| 126 | 18 | 18 | 18 | 18 | 18 | 18 | 18 | 0 |
| 128 | 32 | 32 | 32 | 32 | 0 | 0 | 0 | 0 |
| 130 | 26 | 26 | 26 | 26 | 26 | 0 | 0 | 0 |
| 132 | 22 | 22 | 22 | 22 | 22 | 22 | 0 | 0 |
| 134 | 22 | 22 | 22 | 22 | 22 | 24 | 0 | 0 |
| 136 | 22 | 22 | 22 | 22 | 24 | 24 | 0 | 0 |
| 138 | 22 | 22 | 22 | 24 | 24 | 24 | 0 | 0 |
| 140 | 28 | 28 | 28 | 28 | 28 | 0 | 0 | 0 |
| 142 | 28 | 28 | 28 | 28 | 30 | 0 | 0 | 0 |
| 144 | 24 | 24 | 24 | 24 | 24 | 24 | 0 | 0 |
| 146 | 24 | 24 | 24 | 24 | 24 | 26 | 0 | 0 |
| 148 | 24 | 24 | 24 | 24 | 26 | 26 | 0 | 0 |
| 150 | 30 | 30 | 30 | 30 | 30 | 0 | 0 | 0 |
| 152 | 30 | 30 | 30 | 30 | 32 | 0 | 0 | 0 |
| 154 | 22 | 22 | 22 | 22 | 22 | 22 | 22 | 0 |
| 156 | 26 | 26 | 26 | 26 | 26 | 26 | 0 | 0 |
| 158 | 26 | 26 | 26 | 26 | 26 | 28 | 0 | 0 |
| 160 | 32 | 32 | 32 | 32 | 32 | 0 | 0 | 0 |
| 162 | 20 | 20 | 20 | 20 | 20 | 20 | 20 | 22 |
| 164 | 20 | 20 | 20 | 20 | 20 | 20 | 22 | 22 |
| 166 | 20 | 20 | 20 | 20 | 20 | 22 | 22 | 22 |
| 168 | 28 | 28 | 28 | 28 | 28 | 28 | 0 | 0 |
| 170 | 28 | 28 | 28 | 28 | 28 | 30 | 0 | 0 |
| 172 | 28 | 28 | 28 | 28 | 30 | 30 | 0 | 0 |
| 174 | 28 | 28 | 28 | 30 | 30 | 30 | 0 | 0 |
| 176 | 22 | 22 | 22 | 22 | 22 | 22 | 22 | 22 |
| 178 | 22 | 22 | 22 | 22 | 22 | 22 | 22 | 24 |
| 180 | 30 | 30 | 30 | 30 | 30 | 30 | 0 | 0 |
| 182 | 26 | 26 | 26 | 26 | 26 | 26 | 26 | 0 |
| 184 | 26 | 26 | 26 | 26 | 26 | 26 | 28 | 0 |
| 186 | 26 | 26 | 26 | 26 | 26 | 28 | 28 | 0 |
| 188 | 26 | 26 | 26 | 26 | 28 | 28 | 28 | 0 |
| 190 | 26 | 26 | 26 | 28 | 28 | 28 | 28 | 0 |
| 192 | 32 | 32 | 32 | 32 | 32 | 32 | 0 | 0 |
| 194 | 24 | 24 | 24 | 24 | 24 | 24 | 24 | 26 |

TABLE 1-continued

Distribution of Drives into Spans for a RAID 1E Logical Volume

| Total Drives | Span 1 | Span 2 | Span 3 | Span 4 | Span 5 | Span 6 | Span 7 | Span 8 |
|---|---|---|---|---|---|---|---|---|
| 196 | 28 | 28 | 28 | 28 | 28 | 28 | 28 | 0 |
| 198 | 28 | 28 | 28 | 28 | 28 | 28 | 30 | 0 |
| 200 | 28 | 28 | 28 | 28 | 28 | 30 | 30 | 0 |
| 202 | 28 | 28 | 28 | 28 | 30 | 30 | 30 | 0 |
| 204 | 28 | 28 | 28 | 30 | 30 | 30 | 30 | 0 |
| 206 | 28 | 28 | 30 | 30 | 30 | 30 | 30 | 0 |
| 208 | 26 | 26 | 26 | 26 | 26 | 26 | 26 | 26 |
| 210 | 30 | 30 | 30 | 30 | 30 | 30 | 30 | 0 |
| 212 | 30 | 30 | 30 | 30 | 30 | 30 | 32 | 0 |
| 214 | 30 | 30 | 30 | 30 | 30 | 32 | 32 | 0 |
| 216 | 30 | 30 | 30 | 30 | 32 | 32 | 32 | 0 |
| 218 | 30 | 30 | 30 | 32 | 32 | 32 | 32 | 0 |
| 220 | 30 | 30 | 32 | 32 | 32 | 32 | 32 | 0 |
| 222 | 30 | 32 | 32 | 32 | 32 | 32 | 32 | 0 |
| 224 | 32 | 32 | 32 | 32 | 32 | 32 | 32 | 0 |
| 226 | 28 | 28 | 28 | 28 | 28 | 28 | 28 | 30 |
| 228 | 28 | 28 | 28 | 28 | 28 | 28 | 30 | 30 |
| 230 | 28 | 28 | 28 | 28 | 28 | 30 | 30 | 30 |
| 232 | 28 | 28 | 28 | 28 | 30 | 30 | 30 | 30 |
| 234 | 28 | 28 | 28 | 30 | 30 | 30 | 30 | 30 |
| 236 | 28 | 28 | 30 | 30 | 30 | 30 | 30 | 30 |
| 238 | 28 | 30 | 30 | 30 | 30 | 30 | 30 | 30 |
| 240 | 30 | 30 | 30 | 30 | 30 | 30 | 30 | 30 |
| 242 | 30 | 30 | 30 | 30 | 30 | 30 | 30 | 32 |
| 244 | 30 | 30 | 30 | 30 | 30 | 30 | 32 | 32 |
| 246 | 30 | 30 | 30 | 30 | 30 | 32 | 32 | 32 |
| 248 | 30 | 30 | 30 | 30 | 32 | 32 | 32 | 32 |
| 250 | 30 | 30 | 30 | 32 | 32 | 32 | 32 | 32 |
| 252 | 30 | 30 | 32 | 32 | 32 | 32 | 32 | 32 |
| 254 | 30 | 32 | 32 | 32 | 32 | 32 | 32 | 32 |
| 256 | 32 | 32 | 32 | 32 | 32 | 32 | 32 | 32 |

Figure 6:
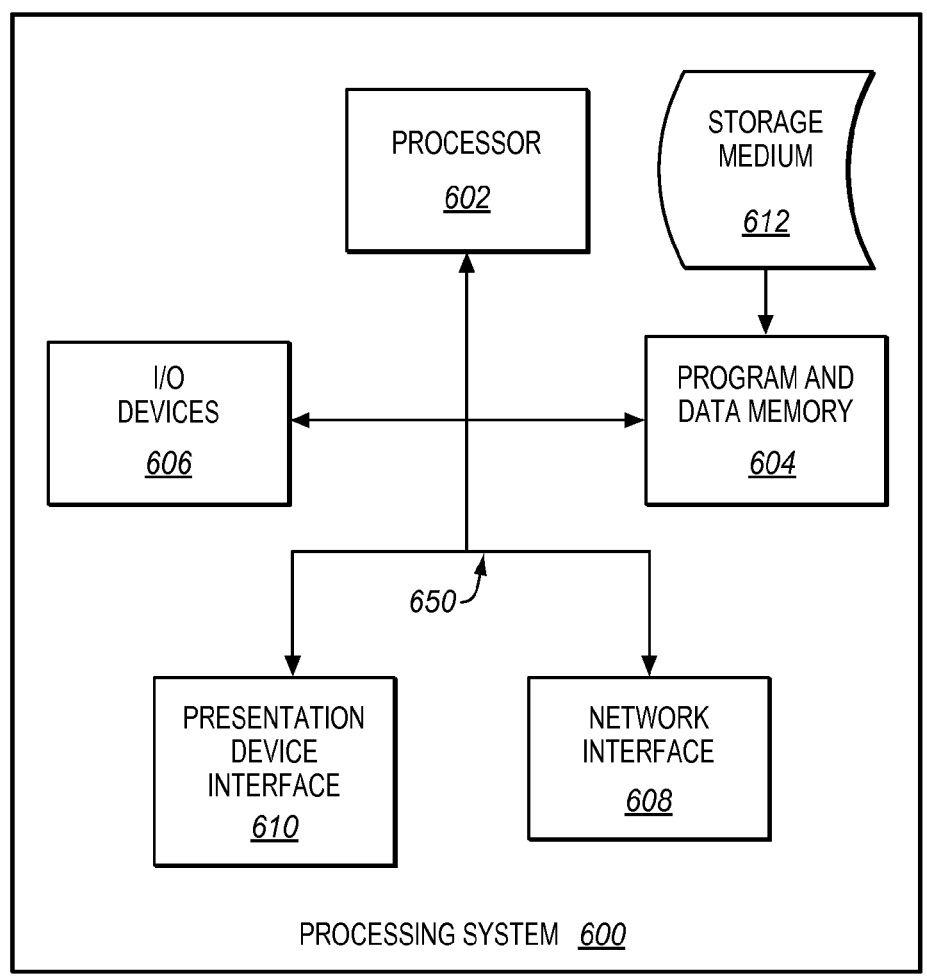
FIG. 6 illustrates an exemplary processing system operable to execute programmed instructions embodied on a computer readable medium.

Embodiments disclosed herein can take the form of software, hardware, firmware, or various combinations thereof In one particular embodiment, software is used to direct a processing system of RAID controller 120 to perform the various operations disclosed herein. FIG. 6 illustrates an exemplary processing system 600 operable to execute a computer readable medium embodying programmed instructions. Processing system 600 is operable to perform the above operations by executing programmed instructions tangibly embodied on computer readable storage medium 612. In this regard, embodiments of the invention can take the form of a computer program accessible via computer readable medium 612 providing program code for use by a computer (e.g., processing system 600) or any other instruction execution system. For the purposes of this description, computer readable storage medium 612 can be anything that can contain or store the program for use by the computer (e.g., processing system 600).

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be integrated with the system to interface to one or more presentation devices, such as printing systems and displays for presentation of presentation data generated by processor 602.

What is claimed is:

1. A Redundant Array of Independent Disks (RAID) controller comprising:
   a control system operable to identify storage devices coupled with the controller and operable to receive input requesting creation of a RAID logical volume; and
   a span manager operable to define multiple RAID spans to implement the logical volume, each span comprising one or more of the coupled storage devices, and at least one of the spans has a different number of storage devices than at least one other span,
   wherein a first span for the logical volume has a storage capacity less than a second span for the logical volume, the one or more storage devices of each span have the same capacity, and
   the span manager is operable to distribute rows for the logical volume evenly across the spans for the logical volume, wherein data for each of the rows is striped across each of the storage devices in a single span, until the storage capacity of the first span is filled, and then to distribute the remaining rows for the logical volume across the remaining spans.

2. The controller of claim 1, wherein:
   the span manager is further operable to determine a number of storage devices for each span based on a requested RAID level for the span and the number of the coupled storage devices that have not yet been assigned to spans.

3. The controller of claim 1, wherein:
   the span manager is further operable to generate mapping tables for each defined span that correlate logical addresses for the logical volume to physical addresses on the storage devices.

4. The controller of claim 1, wherein:
   each span implements an independent RAID configuration having a RAID level that is the same as a RAID level for the logical volume.

5. The controller of claim 4, wherein:
   each row comprises multiple strips of Logical Block Addresses, each strip located on a storage device.

6. The controller of claim 4, wherein:
   each row includes redundancy information that is used to restore data from the logical volume if a storage device in a span fails.

7. The controller of claim 1, wherein:
   the span manager is further operable to determine a number of storage devices for each span based upon a predefined set of rules stored in memory.

8. A method comprising:

identifying storage devices coupled with a Redundant Array of Independent Disks (RAID) controller;

receiving input requesting creation of a RAID logical volume; and defining multiple RAID spans to implement the logical volume, each span comprising one or more of the coupled storage devices, at least one of the spans including a different number of storage devices than at least one other span, wherein a first span for the logical volume has a storage capacity less than a second span for the logical volume, the one or more storage devices of each span have the same capacity, and the method further comprises:

distributing rows for the logical volume evenly across the spans for the logical volume, wherein data for each of the rows is striped across each of the storage devices in a single span, until the storage capacity of the first span is filled; and distributing the remaining rows for the logical volume across the remaining spans.

9. The method of claim 8, further comprising:

determining a number of storage devices for each span based on a requested RAID level for the span and the number of the coupled storage devices that have not yet been assigned to spans.

10. The method of claim 8, further comprising:

generating mapping tables for each defined span that correlate logical addresses for the logical volume to physical addresses on the storage devices.

11. The method of claim 8, wherein:

each span implements an independent RAID configuration having a RAID level that is the same as a RAID level for the logical volume.

12. The method of claim 11, wherein:

each row comprises multiple strips of Logical Block Addresses, each strip located on a storage device.

13. The method of claim 11, wherein:

each row includes redundancy information that is used to restore data from the logical volume if a storage device in a span fails.

14. The method of claim 8, further comprising:

determining a number of storage devices for each span based upon a predefined set of rules stored in memory.

15. A non-transitory computer readable medium embodying programmed instructions which, when executed by a processor, are operable for performing a method comprising:

identifying storage devices coupled with a Redundant Array of Independent Disks (RAID) controller;

receiving input requesting creation of a RAID logical volume; and defining multiple RAID spans to implement the logical volume, each span comprising one or more of the coupled storage devices, at least one of the spans including a different number of storage devices than at least one other span, wherein a first span for the logical volume has a storage capacity less than a second span for the logical volume, the one or more storage devices of each span have the same capacity, and the method further comprises:

distributing rows for the logical volume evenly across the spans for the logical volume, wherein data for each of the rows is striped across each of the storage devices in a single span, until the storage capacity of the first span is filled; and distributing the remaining rows for the logical volume across the remaining spans.

16. The medium of claim 15, the method further comprising:

determining a number of storage devices for each span based on a requested RAID level for the span and the number of the coupled storage devices that have not yet been assigned to spans.

17. The medium of claim 15, the method further comprising:

generating mapping tables for each defined span that correlate logical addresses for the logical volume to physical addresses on the storage devices.

18. The medium of claim 15, wherein:

each span implements an independent RAID configuration having a RAID level that is the same as a RAID level for the logical volume.

19. The medium of claim 18, wherein:

each row comprises multiple strips of Logical Block Addresses, each strip located on a storage device.

20. The medium of claim 18, wherein:

each row includes redundancy information that is used to restore data from the logical volume if a storage device in a span fails.

* * * * *